Aug. 28, 1928.
A. BLUHM
1,682,319
FACING MEMBER FOR BRAKES AND THE LIKE
Filed Dec. 31, 1926
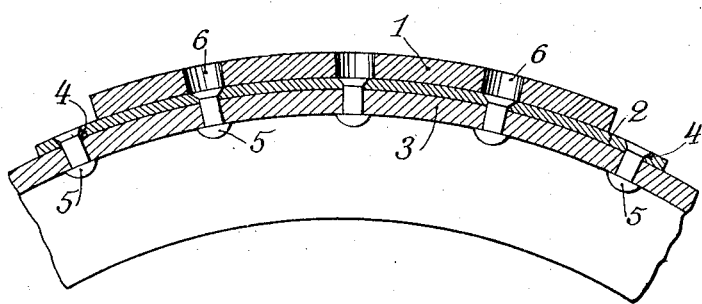
A. Bluhm
INVENTOR
By: Marks & Clerk
Attys.

Patented Aug. 28, 1928.                                          1,682,319

UNITED STATES PATENT OFFICE.

ALEXANDRE BLUHM, OF PARIS, FRANCE, ASSIGNOR TO SOCIETE ANONYME FRANCAISE DU "FERODO," OF PARIS, FRANCE.

FACING MEMBER FOR BRAKES AND THE LIKE.

Application filed December 31, 1926, Serial No. 158,375, and in France January 13, 1926.

The facing members of brakes or friction clutches are usually secured to their support, such as the brake shoe, clutch cone or the like by means of rivets, screws or pins. But when the facing member becomes settled in place or is subject to wear, the heads of the screws or rivets will project from this facing, thus producing a friction of one metal upon another which offers great prejudice to the parts of the brake or the clutch.

The present invention relates to brakes or clutches in which the facing members are secured by an autogenous cementing process whereby the aforesaid defects are obviated, and it has for its object suitable elements for brakes or clutches which are provided with their friction facings which are caused to adhere thereto by the autogenous cementing process, and are ready for use upon a brake or clutch, and in this manner the said elements may be readily replaced when the facing becomes worn.

In the case of a brake which for example comprises brake shoes pivotally mounted upon a support disposed in the interior or at the exterior of a brake drum, as in the usual automobile or like brakes, the invention consists in the preliminary manufacture of brake shoes which comprise a facing member directly cemented to the shoes, and which may be thus mounted at once in all brake drums of the corresponding type; or otherwise, the invention consists in the manufacture of curved members or plates provided with a cemented facing, and adapted for mounting upon the brake shoes by bolts or screws whose heads will not project from the said facing. In the case of clutches or of brakes having tapered friction surfaces, the said elements according to the invention will consist of cones or segments of cones upon which the facing is mounted by direct adhesion, or of metallic rings or segments which are removably mounted upon suitable cones, and which have been preliminarily provided with cemented facings.

In all cases, the invention will offer the advantage of a rapid substitution of the parts when worn out, and will further obviate all risk of wear of the friction members by metallic pieces which may traverse the facing.

Another important feature of the invention consists in the practical use of facings cemented by the autogenous process by means of synthetic resin or like substance, which process can hardly be employed except in a specially equipped factory, by reason of the outfit and the operations required.

The appended drawings show by way of example a sectional view of a facing device in accordance with the invention.

1 is the facing member which is cemented to an intermediate support 2 by the use of glue or any other suitable adhesive substance, such as synthetic resin or the like. The support 2 herein consists of a metal plate, and it has preferably the same curvature as the main support 3 upon which it is to be mounted.

To secure the support 2, it may be provided with countersunk holes 4 for the insertion of the rivets 5, or preferably of screws which are optionally provided with lock nuts, or of bolts with countersunk heads. Adjacent the rivets, screws or bolts, the facing 1 is pierced with the apertures 6 by which they may be put in place.

In these conditions, the facing member 1 and its support 2 will form a single piece which may be preliminarily manufactured to order at the factory, and which can be readily mounted upon an apparatus or can be replaced by another piece upon occasion by any person, whether a mechanic or repair man, or by the user of the apparatus.

In all cases, the facing 1 may be used to the extreme limit and throughout its entire thickness, without any danger of contact between the rivet heads and the brake drum.

Having thus described my apparatus, what I claim as new therein, and my own invention, is:

1. The combination of a braking or friction clutching member, a metallic support upon the said member and a friction facing member cemented to the said support, the whole of the said support and said facing member being secured upon the said braking or friction clutching member, the said facing member and the said support being provided with holes, and fixing members passing through the said holes, the heads of the said fixing members being flush with the surface of the said support.

2. A friction member comprising a metallic support and a friction facing whose composition comprises a binding material and which is secured to said support, the securing of the said friction facing on the support being obtained by the cementing process by means of the same binding material.

3. A friction member comprising a metallic support and a friction facing which is secured to said support and whose composition comprises an artificial resin called synthetic resin the securing of the said facing on the support being obtained by the cementing process by means of the same resin.

In testimony whereof I have hereunto affixed my signature.

ALEXANDRE BLUHM.